US012691418B2

(12) United States Patent
Kim et al.

(10) Patent No.: US 12,691,418 B2
(45) Date of Patent: Jul. 28, 2026

(54) METHOD FOR MANUFACTURING A SEPARATION MEMBRANE BASED ON A POLAR CARBON NANOTUBE DISPERSION AND A POLAR ONE-DIMENSIONAL CARBON BODY

(71) Applicant: Industry-Academic Cooperation Foundation, Yonsei University, Seoul (KR)

(72) Inventors: Daewoo Kim, Seoul (KR); Yunkyu Choi, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 1035 days.

(21) Appl. No.: 17/828,126

(22) Filed: May 31, 2022

(65) Prior Publication Data

US 2022/0387938 A1 Dec. 8, 2022

(30) Foreign Application Priority Data

| Jun. 1, 2021 | (KR) | ......................... | 10-2021-0070527 |
| May 27, 2022 | (KR) | ......................... | 10-2022-0065583 |

(51) Int. Cl.
*B01D 67/00* (2006.01)
*B01D 69/12* (2006.01)
(Continued)

(52) U.S. Cl.
CPC ......... *B01D 67/0079* (2013.01); *B01D 69/12* (2013.01); *B01D 69/1411* (2022.08);
(Continued)

(58) Field of Classification Search
CPC ................ B01D 67/0079; B01D 69/12; B01D 69/1411; B01D 71/0211; B01D 71/0212;
(Continued)

(56) References Cited

U.S. PATENT DOCUMENTS

| 2010/0105834 A1 | 4/2010 | Tour et al. |
| 2014/0081067 A1 | 3/2014 | Tour et al. |
| | (Continued) | |

FOREIGN PATENT DOCUMENTS

| JP | 2012500179 A | 1/2012 |
| JP | 2014512258 A | 5/2014 |
| | (Continued) | |

OTHER PUBLICATIONS

Amadei (Graphene oxide membranes on a hierarchical elemental carbon-based support, Environmental Science: Nano, 2020) (Year: 2020).*

(Continued)

*Primary Examiner* — Anthony J Zimmer
*Assistant Examiner* — Logan Laclair
(74) *Attorney, Agent, or Firm* — The Webb Law Firm

(57) ABSTRACT

Provided are a polar carbon nanotube dispersion which may be dispersed in a solvent at a high concentration, and a separator having improved filtration efficiency based on a polar carbon nanotube manufactured from the dispersion and a polar one-dimensional carbon body. According to the separator and the method for manufacturing the same of the present invention, a polar carbon nanotube dispersion which may be dispersed in a solvent at a high concentration even without use of a surfactant or a stabilizer may be prepared, and a separator which is not easily exfoliated and may be stably used even under a high pressure may be manufactured, based on a polar carbon nanotube prepared from the polar carbon nanotube dispersion and a polar one-dimensional carbon body.

11 Claims, 9 Drawing Sheets

(51) Int. Cl.
  *B01D 69/14* (2006.01)
  *B01D 71/02* (2006.01)

(52) U.S. Cl.
  CPC ...... *B01D 71/0211* (2022.08); *B01D 71/0212*
        (2022.08); *B01D 2323/219* (2022.08)

(58) Field of Classification Search
  CPC ............ B01D 2323/219; B01D 61/027; B01D
        2325/20; B01D 69/02; B01D 67/0025;
        B01D 67/0088; B01D 67/009; B01D
        69/10; C01B 32/174; C01B 32/198; C01P
                                        2004/17
  See application file for complete search history.

(56) References Cited

U.S. PATENT DOCUMENTS

| 2014/0097146 A1 | 4/2014 | Shah et al. |
| 2014/0120024 A1 | 5/2014 | Tour et al. |
| 2019/0062165 A1 | 2/2019 | Nguyen |

FOREIGN PATENT DOCUMENTS

| JP | 2015535743 A | 12/2015 |
| JP | 6164695 B2 | 7/2017 |
| JP | 6679117 B2 | 4/2020 |
| KR | 1020110050523 A | 5/2011 |
| KR | 1020150135090 A | 12/2015 |
| KR | 1020170125444 A | 11/2017 |
| KR | 1020170135564 A | 12/2017 |
| KR | 1020200044072 A | 4/2020 |

OTHER PUBLICATIONS

Kim et al. (One dimensional building blocks for molecular separation: laminated graphitic nanoribbons, Nanoscale, 2017) (Year: 2017).*

Liu et al. (Preparation and applications of Nafion-functionalized multiwalled carbon nanotubes for proton exchange membranefuelcells, Journal of Materials Chemistry, 2010) (Year: 2010).*

Wepasnick et al. (Surface and structural characterization of multi-walled carbon nanotubes following different oxidative treatments, Carbon, 2011) (Year: 2011).*

Khani et al. (Influence of surface oxidation on the morphological and crystallographic structure of multi-walled carbon nanotubes via different oxidants, Journal of Nanostructure in Chemistry, 2013) (Year: 2013).*

Hough et al. (Viscoelasticity of Single Wall Carbon Nanotube Suspensions, Phys. Rev. Lett., 2004) (Year: 2004).*

Kosynkin et al. (Longitudinal unzipping of carbon nanotubes to form graphene nanoribbons, Nature, 2009) (Year: 2009).*

Wong et al., "Graphene Oxide Nanoribbons from the Oxidative Opening of Carbon Nanotubes Retain Electrochemically Active Metallic Impurities", Angew. Chem. Int. Ed., 2013, pp. 1-5, vol. 52.

Edwards, et al. "Carbon nanotubes in scaffolds for tissue engineering", Expert Rev. Med. Devices, 2009, pp. 499-505, vol. 6, No. 5.

Heister et al., "Higher Dispersion Efficacy of Functionalized Carbon Nanotubes in Chemical and Biological Environments", ACS Nano, 2010, pp. 2615-2626, vol. 4, No. 5.

* cited by examiner

FIG. 4
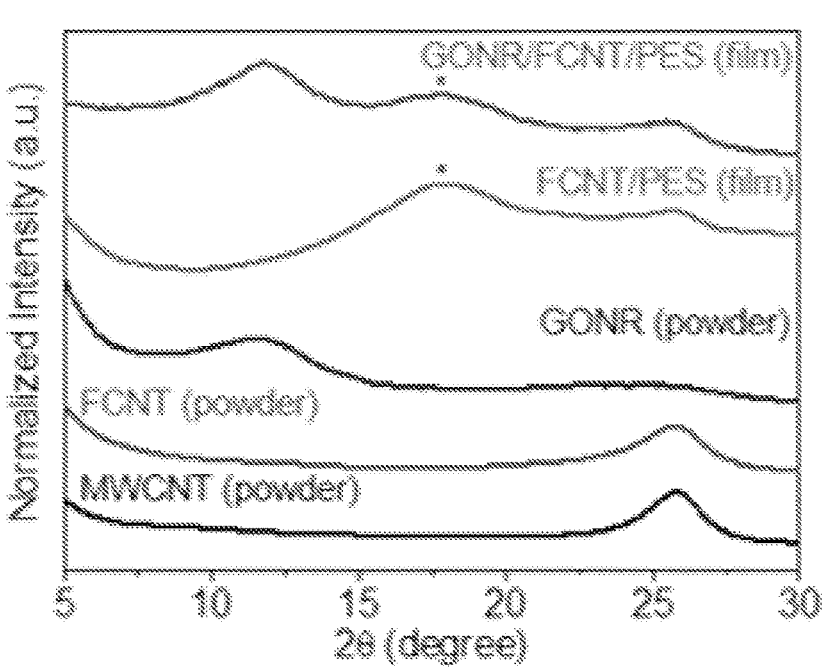
FIG. 5(a)                        FIG. 5(b)
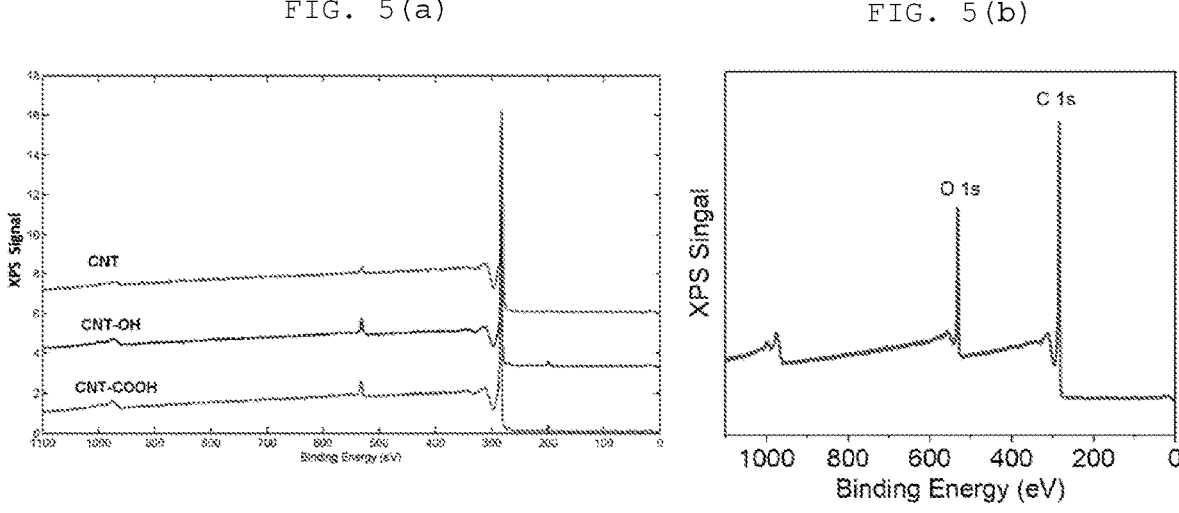

FIG. 12(a)                    FIG. 12(b)
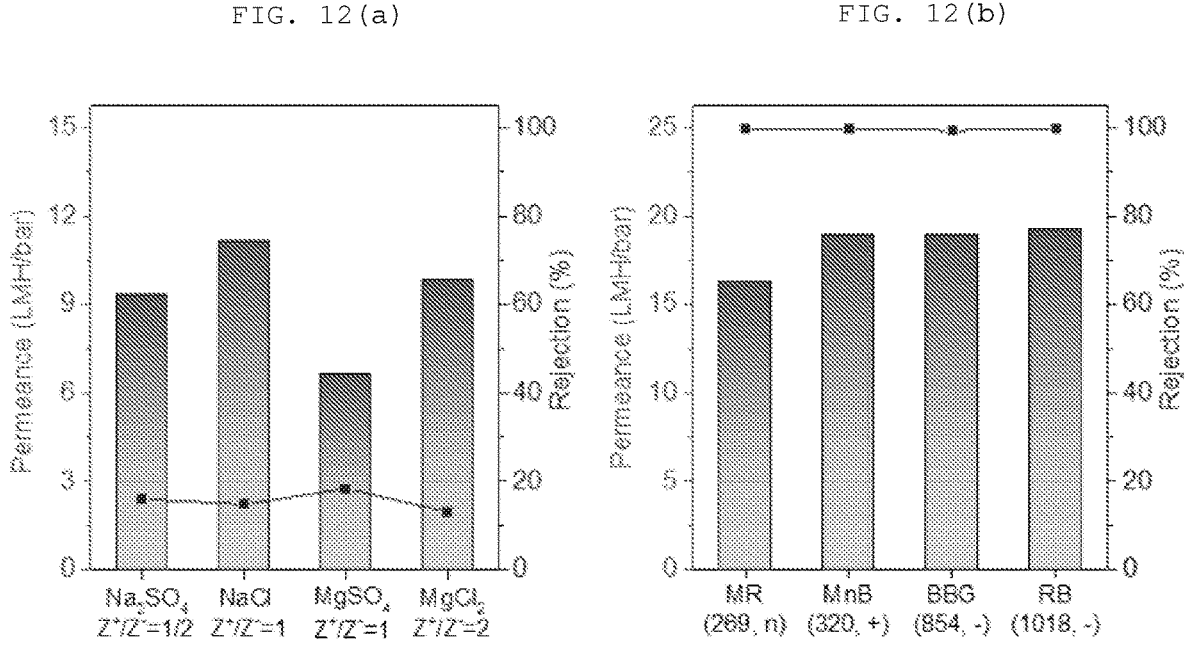

METHOD FOR MANUFACTURING A SEPARATION MEMBRANE BASED ON A POLAR CARBON NANOTUBE DISPERSION AND A POLAR ONE-DIMENSIONAL CARBON BODY

CROSS-REFERENCE TO RELATED APPLICATIONS

This application claims priority to Korean Patent Application Nos. 10-2021-0070527 filed Jun. 1, 2021 and 10-2022-0065583 filed May 27, 2022, the disclosures of which are hereby incorporated by reference in their entirety.

BACKGROUND OF THE INVENTION

Field of the Invention

The following disclosure relates to a polar carbon nanotube dispersion which may be dispersed in a solvent at a high concentration, and a separator having improved filtration efficiency based on a polar carbon nanotube manufactured from the dispersion and a polar one-dimensional carbon body.

Description of Related Art

Since membrane separation is less expensive, has simpler equipment, and has higher energy efficiency than other methods such as distillation and adsorption, it is effective for separating small molecules/ions/solvents. In recent years, two-dimensional materials such as graphene oxide, transition metal dichalcogenide, and MXene are used in membrane manufacture, due to their advantages of high solvent permeability and precise molecular selectivity. Since among various 2D materials, graphene may allow manufacture of a large area by continuous coating such as doctor blade and slot-die coating and may withstand chemical and mechanical conditions, it is selected as a particularly promising material. As described above, graphene has many advantages, but is easily exfoliated depending on the conditions such as pressure and solvent, and thus, an additional treatment is needed for improving mechanical stability and adhesive strength. Therefore, a support with an appropriate pore structure, stable mechanical/chemical properties, and strong adhesive strength with a graphene layer is needed. In order to complement the support, various studies on polydopamine (PDA), carbon nanotubes (CNT), diamine, polyethyleneimine (PEI), plasma treatment, and the like, have been conducted. However, although the chemical crosslinking between a support and graphene is effective for improving stability of a membrane, the polymer chain in a polymer support may be broken by a chemical treatment. In addition, an inorganic support having high mechanical stability may be used even after surface modification but has a problem in terms of high manufacturing costs and brittleness.

Therefore, research and development of appropriate support are still required for use of a graphene-based membrane under actual conditions.

SUMMARY OF THE INVENTION

An embodiment of the present invention is directed to providing a polar carbon nanotube dispersion which may be dispersed in a solvent at a high concentration, and a separator including a polar carbon nanotube manufactured from the dispersion and a polar one-dimensional carbon body, which may be stably used even at high pressure and has improved filtration efficiency.

In one general aspect, a separator includes: a porous support; a porous first coating layer including a polar carbon nanotube, placed on the porous support; and a second coating layer including a polar one-dimensional carbon body, placed on the porous first coating layer.

In the separator of the present invention, the polar carbon nanotube may have an oxygen/carbon atomic ratio of 0.1 or more and a full width at half maximum of 2.0 or more at a position of $2\theta=25.6°$ of XRD, and a polar group of the polar carbon nanotube may be positioned on the surface of the carbon nanotube.

In the separator of the present invention, the porous first coating layer may be prepared by applying a viscoelastic polar carbon nanotube dispersion.

In the separator of the present invention, a polar group of the polar one-dimensional carbon body may include any one or more selected from the group consisting of a hydroxyl group, an epoxy group, and a carboxyl group, the polar group may be unevenly distributed at the edge of the polar one-dimensional carbon body, and the polar one-dimensional carbon body may be graphene nanoribbon.

In the separator of the present invention, an interlayer spacing of the second coating layer may be 5 to 20 Å, a thickness ratio between the porous first coating layer and the second coating layer may be 5:1 to 20:1, and the polar carbon nanotube may have a lower oxygen/carbon atomic ratio than the polar one-dimensional carbon body.

In the separator of the present invention, an organic dye rejection rate may be 80% or more and a sodium chloride rejection rate may be 20% or less, with respect to a mixture including sodium chloride and an organic dye, under the condition of 10 bar.

In another general aspect, a method for manufacturing a separator includes: (a) preparing a dispersion including a polar carbon nanotube; (b) preparing a dispersion including a polar one-dimensional carbon body; (c) applying the dispersion including a polar carbon nanotube on a porous support to prepare a porous first coating layer; and (d) applying the dispersion including a polar one-dimensional carbon body on the porous first coating layer to prepare a second coating layer.

In the method for manufacturing a separator of the present invention, the step (a) of preparing a dispersion including a polar carbon nanotube may include (a-1) partially oxidizing a carbon nanotube to prepare the polar carbon nanotube; (a-2) mechanically milling the polar carbon nanotube; and (a-3) sonicating the milled polar carbon nanotube.

In another general aspect, an organic dye is separated from a mixture of a salt and an organic dye using the separator.

In another general aspect, a polar carbon nanotube dispersion includes a polar carbon nanotube having a three-dimensional porous scaffold structure.

In the polar carbon nanotube dispersion, the polar carbon nanotube may have an oxygen/carbon atomic ratio of 0.1 or more and a full width at half maximum of 2.0 or more at a position of $2\theta=25.6°$ of XRD, and the polar carbon nanotube dispersion may have viscoelasticity.

In still another general aspect, a method for preparing a polar carbon nanotube dispersion includes: (a) partially oxidizing a carbon nanotube to prepare a polar carbon nanotube; (b) mechanically milling the polar carbon nanotube; (c) mixing the milled polar carbon nanotube with a solvent to prepare a dispersion; and (d) sonicating the dispersion.

In the method for preparing a polar carbon nanotube dispersion of the present invention, the solvent may be selected from the group consisting of water, ethanol, isopropyl alcohol (IPA), acetone, dimethylformamide (DMF), and N-methylpyrrolidone (NMP), a concentration of the polar carbon nanotube in the polar carbon nanotube dispersion may be 1 mg/mL or more, and the polar carbon nanotube dispersion may include substantially no surfactant.

Other features and aspects will be apparent from the following detailed description, the drawings, and the claims.

BRIEF DESCRIPTION OF THE DRAWINGS

FIG. 4 is a graph showing XRD patterns of the separator according to an exemplary embodiment of the present invention.

FIGS. 5(a) and (b) are graphs of chemical structures of (a) a conventional oxidized carbon nanotube and (b) a polar carbon nanotube of the present invention, observed using an XPS spectrum.

FIGS. 12(a) and (b) are graphs showing permeability and rejection rates (a) when a salt was permeated through the separator according to an exemplary embodiment of the present invention and (b) when an organic dye was permeated through the separator according to an exemplary embodiment of the present invention.

DESCRIPTION OF THE INVENTION

Figures 1, 2A, 2B, 2C, 3:
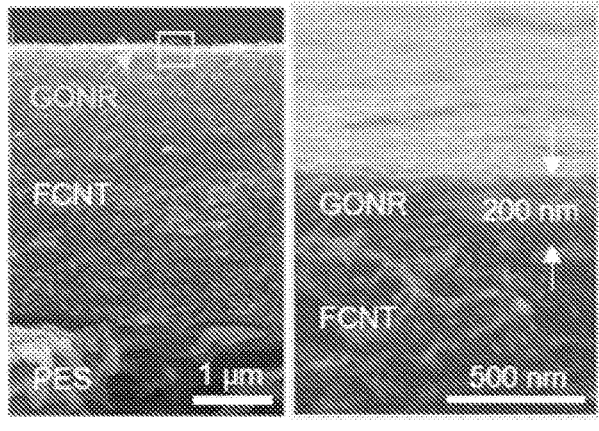
FIG. 1 is a schematic diagram of a method for manufacturing a separator and a separator manufactured therefrom according to the present invention.
FIGS. 2(a)-(c) are drawings of structures of (a) MWCNT, (b) FCNT, and (c) GONR, observed by SEM and TEM.
FIG. 3 is a drawing of a cross section of the separator according to an exemplary embodiment of the present invention, observed by SEM.

Hereinafter, a polar carbon nanotube dispersion, a separator including the same, and a method for manufacturing the same of the present invention will be described in detail with reference to the accompanying drawings.

The drawings to be provided below are provided by way of example so that the spirit of the present invention can be sufficiently transferred to a person skilled in the art to which the present invention pertains. Therefore, the present invention is not limited to the drawings provided below but may be embodied in many different forms, and the drawings suggested below may be exaggerated in order to clear the spirit of the present invention. Technical terms and scientific terms used herein have the general meaning understood by those skilled in the art to which the present invention pertains, unless otherwise defined, and the description for the known function and configuration which may unnecessarily obscure the gist of the present invention will be omitted in the following description and the accompanying drawings.

In addition, the singular form used in the specification and claims appended thereto may be intended to include a plural form also, unless otherwise indicated in the context.

In the present specification and the appended claims, the terms such as "first" and "second" are not used in a limited meaning but used for the purpose of distinguishing one constituent element from other constituent elements.

In the present specification and the appended claims, the terms such "comprise" or "have" mean that there is a characteristic, or a constituent element described in the specification, and as long as it is not particularly limited, a possibility of adding one or more other characteristics or constituent elements is not excluded in advance.

In the present specification and the appended claims, when a portion such as a membrane (layer), a region, and a constituent element is present on another portion, not only a case in which the portion is in contact with and directly on another portion but also a case in which other membranes (layers), other regions, other constitutional elements are interposed between the portions is included.

The term "micropores" in the present invention means that internal pores have an average diameter of less than 2 nm, "mesopores" means that internal pores have an average diameter of 2 nm to 50 nm, and "macropores" means that internal pores have an average diameter of more than 50 nm.

The separator according to the present invention is characterized by including: a porous support; a porous first coating layer including a polar carbon nanotube, placed on the porous support; and a second coating layer including a polar one-dimensional carbon body, placed on the porous first coating layer.

The porous support according to an exemplary embodiment of the present invention is not particularly limited as long as it is a material used as a support of the separator, but as a non-limiting example, it may be a porous inorganic support or a porous polymer support, preferably a porous polymer support. The porous polymer support may be a natural polymer or a synthetic polymer, but is not limited to a certain polymer. The natural polymer may be a cellulose-based polymer or a derivative thereof, and a non-limiting example of the synthetic polymer may be selected from polycarbonate-based polymers, polyamide-based polymer, polyimide-based polymers, polyolefin-based polymers, polyacrylate-based polymers, polysulfone-based polymers, polyether-based polymers, polyester-based polymers, and the like. A specific example thereof may be selected from the group consisting of polyethylene, polypropylene, polybutylene, polypentene, polymethylpentene, polyethylene terephthalate, polybutylene terephthalate, polyacetal, polyethersulfone, polyphenylene oxide, polyphenylene sulfide, polyethylene naphthalene, and copolymers thereof, and preferably, polyethersulfone (PES) may be used.

The porous support according to an exemplary embodiment of the present invention may have a pore average size of 0.01 μm to 1 μm, preferably 0.05 μm to 0.5 μm, and more preferably 0.1 μm to 0.3 μm. In addition, the porous support according to an exemplary embodiment of the present invention may have a porosity of 20% to 80%, preferably 20% to 60%. By having the pore size and the porosity in the above ranges, the material adsorbed to the separator may be easily permeated through the support.

The polar carbon nanotube according to an exemplary embodiment of the present invention may include an oxygen-containing functional group, and the oxygen-containing functional group may be any one or more selected from the group consisting of a hydroxyl group, an epoxy group, and a carboxyl group. In addition, the polar carbon nanotube according to an exemplary embodiment of the present invention may have an entangled structure. By including the functional group and the entangled structure, the polar carbon nanotube is stably placed on the porous support, so that it is not easily released from the porous support even at high pressure.

The polar carbon nanotube according to an exemplary embodiment of the present invention may have an oxygen/carbon atomic ratio of 0.1 or more, preferably 0.1 to 0.5, and more preferably 0.2 to 0.3.

In addition, the polar carbon nanotube according to an exemplary embodiment of the present invention may have a larger full width at half maximum (FWHM) at a position of $2\theta=25.6°$ of XRD than the full width at half maximum of a common carbon nanotube (1.98), and the full width at half maximum may be specifically 2.0 or more, preferably 2.2 or more, and more preferably 2.2 to 2.5. By having the oxygen/carbon atomic ratio and FWHM in the above ranges, it contains a plurality of oxygen groups, so that a strong electrostatic repulsion occurs in a solution, and a three-dimensional scaffold structure may be formed in a solvent by self-assembly rather than a simple agglomeration is formed. However, since the carbon nanotube to which a polar group is introduced by a common oxidation reaction has a low oxygen/carbon atomic ratio, it has improved dispersibility in an aqueous phase, but has a high tendency to agglomerate, and thus, it is impossible to prepare a homogeneous high-concentration dispersion. Here, the scaffold structure means a porous structure like a sponge which is self-entangled by self-assembly, and the size of scaffold pores corresponds to usual macropores having a diameter of several micrometers. The polar carbon nanotube forming the scaffold forms an entangled structure.

The polar carbon nanotube according to an exemplary embodiment of the present invention may be prepared by applying a viscoelastic polar carbon nanotube dispersion. Since the polar carbon nanotube prepared by applying a viscoelastic polar carbon nanotube dispersion has a low surface roughness and a viscoelasticity like a polymer solution, a coating solution may be uniformly applied to a substrate by bar coating/doctor blade coating.

The polar carbon nanotube dispersion according to an exemplary embodiment of the present invention may form a structure having a three-dimensional porous scaffold, and the three-dimensional porous scaffold structure may be formed by a structure in which polar carbon nanotubes are entangled with each other. Since the polar carbon nanotube present in the polar carbon nanotube dispersion has a three-dimensional porous scaffold structure, agglomeration of polar carbon nanotubes may be suppressed, and the carbon nanotubes may be dispersed in various solvents without addition of a surfactant.

The polar carbon nanotube according to an exemplary embodiment of the present invention may have a surface area of 100 to 500 m$^2$/g, preferably 200 to 300 m$^2$/g. By having the surface area in the above range, agglomeration of the polar carbon nanotubes in the first coating layer may be suppressed, and the carbon nanotubes may be dispersed in various solvents without addition of a surfactant.

The polar group of the polar carbon nanotube according to an exemplary embodiment of the present invention may be positioned on the surface of the carbon nanotube. The carbon nanotube including a polar group positioned on the surface has both hydrophilicity by a polar group and hydrophobicity by carbon, thereby forming a uniform coating layer without much dependence on the surface properties of the porous support.

The polar carbon nanotube according to an exemplary embodiment of the present invention may be a single-walled polar carbon nanotube or a multi-walled polar carbon nanotube, and preferably a multi-walled carbon nanotube may be used. The multi-walled polar carbon nanotube has excellent mechanical strength, excellent structural maintenance to tensile repeatability, and a large tensile range, and thus, is advantageous for use in a separator. In addition, the polar carbon nanotube may have an aspect ratio of 100 to 50,000, preferably 1,000 to 45,000, and more preferably 4,000 to 40,000.

By having the aspect ratio in the above range, mechanical strength may be excellent without collapse of the structure of the scaffold on the porous support.

The polar one-dimensional carbon body according to an exemplary embodiment of the present invention may include a polar group, and the polar group may include any one or more selected from the group consisting of a hydroxyl group, an epoxy group, and a carboxyl group. In addition, the polar group may be unevenly distributed at the edge of the polar one-dimensional carbon body, and a ratio of a heteroatom contained in the polar group of the total atoms of the polar one-dimensional carbon body may be 0.1 to 50 atom %, preferably 0.1 to 20 atom %, and more preferably 1 to 10 atom %, but is not limited thereto.

Since the polar one-dimensional carbon body according to an exemplary embodiment of the present invention may include a polar group to have a certain level of hydrophilicity, it has excellent dispersibility to water and may form a uniform aqueous dispersion or aqueous solution, and the aqueous dispersion or aqueous solution may be applied to easily form a uniform coating layer. In addition, the polar one-dimensional carbon body including the polar group unevenly distributed at the edge may have both a certain level of hydrophilicity by the polar group and hydrophobicity by carbon, thereby forming a uniform coating layer.

The polar one-dimensional carbon body according to an exemplary embodiment of the present invention may be a graphene-based compound, preferably a graphene nanoribbon. The graphene nanoribbon is preferred for being uniformly coated on the polar carbon nanotube to form a thin film, and since the graphene nanoribbon forms a thin film stably deposited on the polar carbon nanotube by interaction, and also, both permeability and selectivity depending on the size of particles may be implemented.

The graphene nanoribbon according to an exemplary embodiment of the present invention may have a width length of 10 to 100 nm, preferably 20 to 70 nm, and more preferably 30 to 50 nm. By having the width length in the above range, the graphene nanoribbon may have an excellent surface area. In addition, the graphene nanoribbon may have an aspect ratio of 1 to 50,000, preferably 10 to 40,000.

By having the aspect ratio in the above range, dispersibility may be excellent, and also, mechanical strength may be excellent.

The second coating layer according to an exemplary embodiment of the present invention may have a multilayer structure. Here, an interlayer spacing of the multilayer structure may be formed to be 1 to 100 Å, preferably 3 to 50 Å, and more preferably 5 to 20 Å. By having the interlayer spacing in the above range, permeation of materials having a relatively large size is prevented without preventing permeation of small materials, thereby implementing both excellent permeability and selectivity.

A thickness ratio between the porous first coating layer and the second coating layer according to an exemplary embodiment of the present invention may be 5:1 to 20:1, preferably 10:1 to 20:1. More specifically, the porous first coating layer according to an exemplary embodiment of the present invention may be formed to have a thickness of 1 to 10 μm, preferably 1.5 to 7.5 μm, and more preferably 2 to 5 μm. In addition, the second coating layer according to an exemplary embodiment of the present invention may be formed to have a thickness of 10 to 500 nm, preferably 50 to 400 nm, and more preferably 100 to 300 nm. By having the thickness in the above range, the stability, the permeability, and the selectivity of the separator may be all implemented.

The polar carbon nanotube according to an exemplary embodiment of the present invention may have a lower oxygen/carbon atomic ratio than the polar one-dimensional carbon body.

More specifically, the polar one-dimensional carbon body according to an exemplary embodiment of the present invention may have an oxygen/carbon atomic ratio of 0.2 or more, preferably 0.2 to 0.5, and more preferably 0.3 to 0.4. That is, the polar carbon nanotube may have a lower oxidation degree than the polar one-dimensional carbon body. Due to the difference in the oxidation degree, the polar one-dimensional carbon body coating layer has a denser structure than the polar carbon nanotube, so that the permeability may vary with the particle size, and also, the porous support, the polar carbon nanotube, and the polar one-dimensional carbon body coating layer may be stably bonded. In addition, since both the porous first coating layer and the second coating layer include a polar group, specifically, an oxygen-containing functional group, a n-n bond may be formed by a hydrogen bond between polar groups and an aromatic n electron. Therefore, the porous first coating layer and the second coating layer may be stably bonded by the hydrogen bond and the n-n bond.

The separator according to an exemplary embodiment of the present invention may have an organic dye rejection rate of 80% or more and a sodium chloride rejection rate of 20% or less, preferably an organic dye rejection rate of 85% or more and a sodium chloride rejection rate of 15% or less, with respect to a mixture of sodium chloride and the organic dye under the conditions of 10 bar.

Therefore, a method for separating an organic dye, which is characterized by separating an organic dye from a mixture of a salt and the organic dye, using the separator according to an exemplary embodiment of the present invention, may be provided. Here, the salt is not particularly limited as long as it is commonly used, but as a non-limiting example, $Na_2SO_4$, NaCl, $MgSO_4$, $MgCl_2$, and the like may be selected, and the organic dye is also not particularly limited as long as it is a commonly used organic dye, but as a non-limiting example, methyl red (MR), methylene blue (MnB), brilliant blue G (BBG), rose bengal (RB), and the like may be selected.

Hydrogen may be separated from a gas mixture using the separator according to an exemplary embodiment of the present invention, in which the gas mixture may include hydrocarbon and hydrogen, and specifically, the hydrocarbon according to the present invention may be C1 to C8 aliphatic hydrocarbon, and for example, may be selected from $CH_4$, $C_2H_4$, $C_2H_6$, $C_3H_6$, $C_3H_8$, and the like, but the present invention is not limited thereto. In addition, since a dye may be separated from dye waste water, the separator may be used as a separator for treating dye waste water.

The method for manufacturing a separator according to the present invention is characterized by including: (a) preparing a dispersion including a polar carbon nanotube; (b) preparing a dispersion including a polar one-dimensional carbon body; (c) applying the dispersion including a polar carbon nanotube on a porous support to prepare a porous first coating layer; and (d) applying the dispersion including a polar one-dimensional carbon body on the porous first coating layer to prepare a second coating layer.

In the method for manufacturing a separator according to an exemplary embodiment of the present invention, the step (a) of preparing a dispersion including a polar carbon nanotube may include (a-1) partially oxidizing a carbon nanotube to prepare the polar carbon nanotube; (a-2) mechanically milling the polar carbon nanotube; and (a-3) sonicating the milled polar carbon nanotube. Here, by the step of mechanically milling the polar carbon nanotube and the step of sonicating, the agglomeration of the polar carbon nanotube is prevented, and the porous first coating layer is uniformly coated on the porous support to prevent exfoliation.

The polar carbon nanotube dispersion according to the present invention is characterized by including a polar carbon nanotube having a three-dimensional porous scaffold structure.

In the polar carbon nanotube dispersion according to the present invention, the polar carbon nanotube may be a polar carbon nanotube included in the separator as described above. Therefore, the polar carbon nanotube in the polar carbon nanotube dispersion according to the present invention may have an oxygen/carbon atomic ratio of 0.1 or more, preferably 0.1 to 0.5, and more preferably 0.2 to 0.3. In addition, the polar carbon nanotube according to an exemplary embodiment of the present invention may have a larger full width at half maximum (FWHM) at a position of $2\theta=25.6°$ of XRD than the full width at half maximum of a common carbon nanotube (1.98), and the full width at half maximum may be specifically 2.0 or more, preferably 2.2 or more, and more preferably 2.2 to 2.5. In addition, the polar carbon nanotube dispersion may have viscoelasticity. By the characteristics, a three-dimensional scaffold structure may be formed in a solvent by self-assembly, and a high-concentration dispersion which is homogeneous in various solvents as compared with common carbon nanotubes having a high tendency of agglomeration may be prepared.

The method for preparing a polar carbon nanotube dispersion according to the present invention is characterized by including: (a) partially oxidizing a carbon nanotube to prepare a polar carbon nanotube; (b) mechanically milling the polar carbon nanotube; (c) mixing the milled polar carbon nanotube with a solvent to prepare a dispersion; and (d) sonicating the dispersion.

In the method for preparing a polar carbon nanotube dispersion according to an exemplary embodiment of the present invention, the solvent of the dispersion is not particularly limited as long as it may disperse polar carbon nanotubes, but may be water, ethanol, 2-propanol, acetone, dimethylformamide, or N-methyl-2-pyrrolidone, and water is preferred.

In the method for preparing a polar carbon nanotube dispersion according to an exemplary embodiment of the present invention, a concentration of the polar carbon nanotube in the dispersion including the polar carbon nanotube may be 1 mg/mL or more, preferably 1 to 100 mg/mL, and more preferably 20 to 50 mg/mL. By having the concentration in the above range, a conventional problem of only allowing dispersion at a low concentration and showing agglomerated particles at a high concentration is solved, and that excellent dispersibility may be shown.

In the method for preparing a polar carbon nanotube dispersion according to an exemplary embodiment of the present invention, the polar carbon nanotube dispersion may include substantially no surfactant. Here, including substantially no surfactant means that the weight of the surfactant is included at less than 0.1 wt %, specifically at less than 0.01 wt %, with respect to the total weight of the polar carbon nanotube dispersion.

Generally, in order to manufacture a polar carbon nanotube film, the dispersion may be prepared using a surfactant, but in this case, the process is complicated and additional washing is needed for removing the surfactant. In addition, in order not to use the surfactant, a solvent such as dimethylformamide (DMF) or N-methyl-2-pyrrolidone (NMP) is used to prepare a dispersion, but the properties of the solvent cause the porous support to be damaged. Therefore, in the method for preparing a polar carbon nanotube dispersion according to an exemplary embodiment of the present invention, the above problem may be solved by including substantially no surfactant.

Hereinafter, the present invention will be described in detail by the examples. However, the examples are for describing the present invention in more detail, and the scope of the present invention is not limited to the following examples.

<Example> GONR/FCNT/PES Separators

A polar carbon nanotube (functionalized carbon nanotube; FCNT) and graphene oxide nanoribbon (GONR) were prepared by adjusting the oxidation degree of a multi-walled carbon nanotube (MWCNT) by changing a ratio of carbon nanotube (CNT)/$KMnO_4$ and an oxidation time. An oxygen-containing functional group was produced in MWCNT by a reaction of $KMnO_4$ to $\beta$ and $\gamma$-alkene, and by increasing the density of the oxygen-containing functional group, compression of MWCNT was released. A FCNT layer was applied to polyethersulfone (PES), and a GONR layer was sequentially coated by vacuum filtration, thereby manufacturing a double layer including FCNT and GONR layers. Specific manufacturing methods are as follows:

1. Preparation of FCNT and GONR

First, FCNT was prepared by partial oxidation of MWCNT. MWCNT had a diameter of 15 to 25 nm, a length of 20 to 100 μm, and a thickness of 7 to 12 layers. 200 mL of $H_2SO_4$ was mixed with 4 g of MWCNT, 8 g of $KMnO_4$ was added to the mixture in an ice bath, and then the mixture was stirred at a temperature of 35° C. After stirring for 1 hour, 350 mL of deionized water and 80 mL of hydrogen peroxide ($H_2O_2$) were added to the mixture sequentially to finish the oxidation reaction, and the remaining oxidizing agent was removed. Next, GONR was synthesized in the same manner as the preparation method of FCNT, except that 2 g of MWCNT and 10 g of $KMnO_4$ were mixed. Thereafter, the mixed solution was filtrated through a cellulose filter paper to remove impurities and an acidic solvent, thereby obtaining FCNT and GONR.

2. Preparation of FCNT Dispersion

FCNT was ball-milled at 1200 rpm for 6 hours and then ball-milled at 300 rpm for 6 hours. After the ball milling, deionized water was added to FCNT to adjust the concentration to 40 mg/mL, the prepared dispersion was sonicated for 3 hours by a horn sonicator (VC 505, Sonics & Materials, USA). A FCNT dispersion showed viscosity like hydrogel after the sonication. The FCNT dispersion was further diluted with deionized water to prepare a 1 mg/mL of a solution.

3. Preparation of GONR/FCNT/PES Separator

A PES support (pore size: 0.2 μm, diameter: 5 cm) was coated with 0.5 mL of a FCNT dispersion (40 mg/mL) and was dried at 60° C. for 3 hours. A diluted GONR solution was filtered and a FCNT layer was coated with a GONR layer. 0.1 mL of a GONR dispersion (5 mg/mL) was diluted with 100 mL of deionized water, filtered under vacuum using a FCNT-coated PES support, and then dried at 60° C. for 3 hours.

<Comparative Example 1> FCNT/PES Separator

The separator was manufactured in the same manner as in Example, except that the GONR layer was not coated in step 3.

<Comparative Example 2> GONR/PES Separator

The separator was manufactured in the same manner as in Example, except that the FCNT layer was not coated in step 3.

<Experimental Example 1> Structure Analysis

FIG. 1 is a schematic diagram of the method for manufacturing the GONR/FCNT/PES separator according to the example and the GONR/FCNT/PES separator manufactured therefrom. It is recognized that a FCNT layer was coated on a polyethersulfone (PES) support and a GONR coating layer was coated on the FCNT layer.

Next, the form and structure of MWCNT, FCNT, and GONR were observed using a transmission electron microscope TEM; JEM-F200, JEOL, Japan) and a field emission scanning electron microscope (SEM; 7610f-plus, JEOL, Japan).

Referring to FIG. 2(*a*), a MWCNT bundle having macropores may be observed in a SEM image of MWCNT, and the diameter of MWCNT was confirmed to be 15 to 25 nm. Next, referring to FIG. 2(*b*), it is observed that FCNT prepared by partially oxidizing MWCNT maintained a multiwall structure and a porous network like MWCNT, and also the partially oxidized region is indicated with an arrow. Next, referring to FIG. 2(*c*), in GONR prepared by unzipping MWCNT, it was confirmed that the width of a nanoribbon was widened to 30 to 50 nm, and there was a dense network formed of GONR.

Next, the cross section of the GONR/FCNT/PES separator according to the example was observed by a SEM image. Referring to FIG. 3, it was confirmed that a FCNT layer having a thickness of 3 μm was applied on a PES support layer, and the thickness of the GONR layer on the upper side was about 200 nm. More specifically, the GONR layer formed a dense layer as compared with the FCNT layer having a porous structure so that the GONR layer may act as a selective layer. Exfoliation of GONR and FCNT was not observed even after the double membrane was dipped in a solvent including water, ethanol, isopropyl alcohol (IPA), sulfuric acid ($H_2SO_4$), and it was confirmed that sodium hydroxide (NaOH), and PES, GONR, and FCNT layers were stably coated.

Next, since the interlayer spacing of the laminated GONR layer is important to determine a separation ability, the XRD pattern of the GONR/FCNT/PES separator was investigated as compared with MWCNT, FCNT, and GONR. For calculating the interlayer spacing of the GONR/FCNT/PES separator, observation was performed at a scanning speed of 1° C./min by high resolution XRD (Smartlab, Rigaku, Japan).

Referring to FIG. 4, FCNT and MWCNT had a peak at 25.6° to show similarity in the XRD pattern, and it was confirmed therefrom that the interlayer spacing and the structure were not influenced by partial oxidation from MWCNT to FCNT, so that they had a similar structure and had an oxygen-containing functional group produced on the surface. However, it was confirmed that FCNT had a broadened peak and had a decreased peak strength as compared with MWCNT due to the decreased crystallinity by oxidation of MWCNT.

However, in the XRD pattern of GONR, the peak was showed at 11.8°, and it is recognized therefrom that there was an oxygen-containing functional group in the base surface and the edge and the interlayer spacing was widened to about 7.5 Å. In addition, the FCNT/PES separator according to Comparative Example 1 and the GONR/FCNT/PES separator according to the example showed a peak at 25.6° by the FCNT layer and a further peak was observed at 11.8° in the GONR/FCNT/PES separator by the GONR layer. That is, it was confirmed that the FCNT layer did not affect the lamination of the GONR layer.

Next, an XPS spectrum was observed for measuring an oxidation degree of FCNT. Referring to FIG. 5(a), a surface treatment was minimized in conventional oxidized CNT for structural maintenance and dispersion of individualized CNT, and thus, the oxidation degree was very low. However, referring to FIG. 5(b), considering that the structure of CNT was maintained while a very high O 1 s peak was also shown, in FCNT, it was confirmed that FCNT was more oxidized than conventional oxidized CNT to have a large number of oxygen functional groups.

Figure 6:
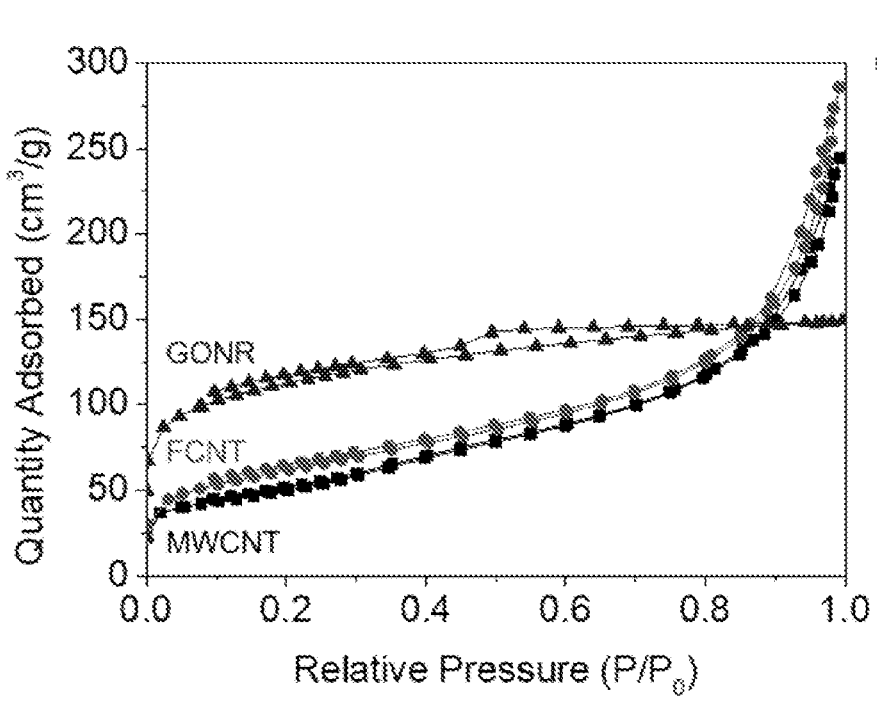
FIG. 6 is a graph showing a BET isotherm of MWCNT, FCNT, and GONR.
Figure 7:
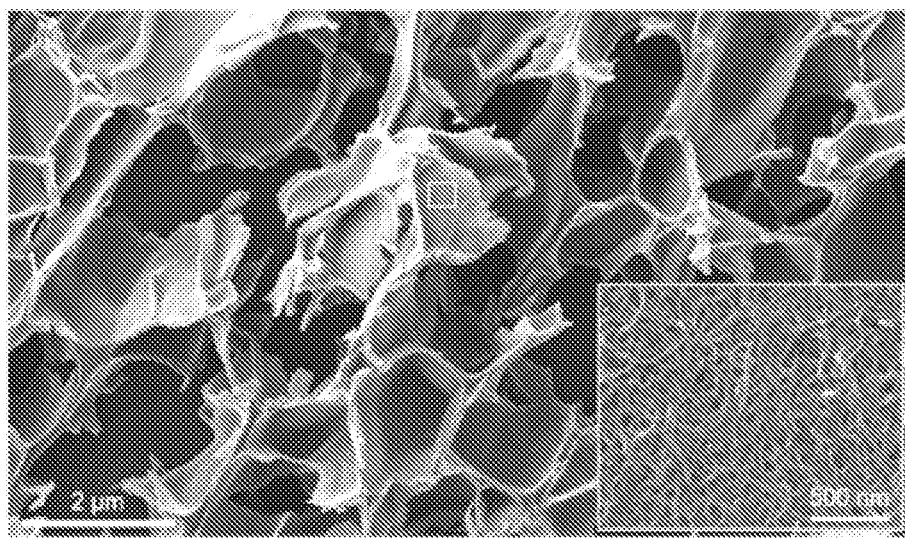
FIG. 7 is a drawing of a FCNT scaffold structure which is structuralized in a high-concentration FCNT dispersion, observed by SEM and TEM.

Next, the porous structures of MWCNT, FCNT, and GONR were observed using a BET isotherm. Referring to FIG. 6, a layer containing FCNT (215.3 $m^2/g$) had a larger surface area than a layer containing MWCNT (178.8 $m^2/g$), and this is because nitrogen gas may be adsorbed/desorbed on the internal wall by internal surface exposure by partial oxidation of MWCNT. It was confirmed that the layer containing GONR (255.6 $m^2/g$) had a larger surface area. It was confirmed therefrom that FCNT was oxidized while maintaining the structure of MWCNT, and the GONR layer had small pores being densely packed to have a denser structure than the FCNT layer. Next, the scaffold structure of FCNT was observed using a field emission scanning electron microscope (SEM; 7610f-plus, JEOL, Japan). Referring to FIG. 7, the scaffold structure of FCNT was observed, and it was confirmed therefrom that a three-dimensional scaffold structure was produced when MWCNT was partially oxidized to FCNT. It was confirmed that FCNT entangled at a high concentration formed a nanoplate and a three-dimensional scaffold. That is, it was confirmed that a strong repulsion to each other occurred in FCNT by CNT having a high aspect ratio (4000-40000) and many oxygen functional groups, and a three-dimensional scaffold structure by self-assembly was formed rather than simple agglomeration or bundle by a mechanical mixing process such as ball milling and sonication.

<Experimental Example 2> Evaluation of Dispersion Degree of FCNT Dispersion

Figure 8:
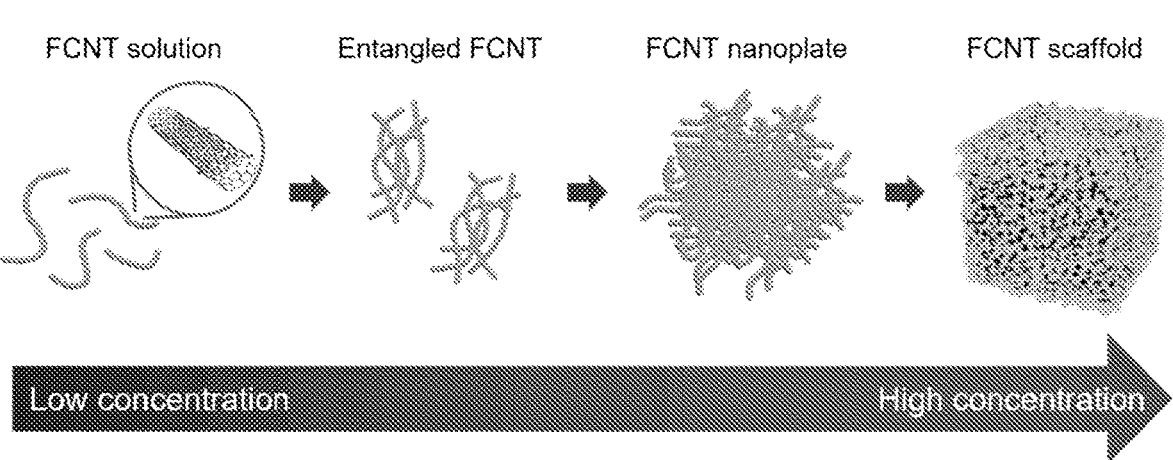
FIG. 8 is a schematic diagram showing a self-assembly process of FCNT in a dispersion.
Figure 9:
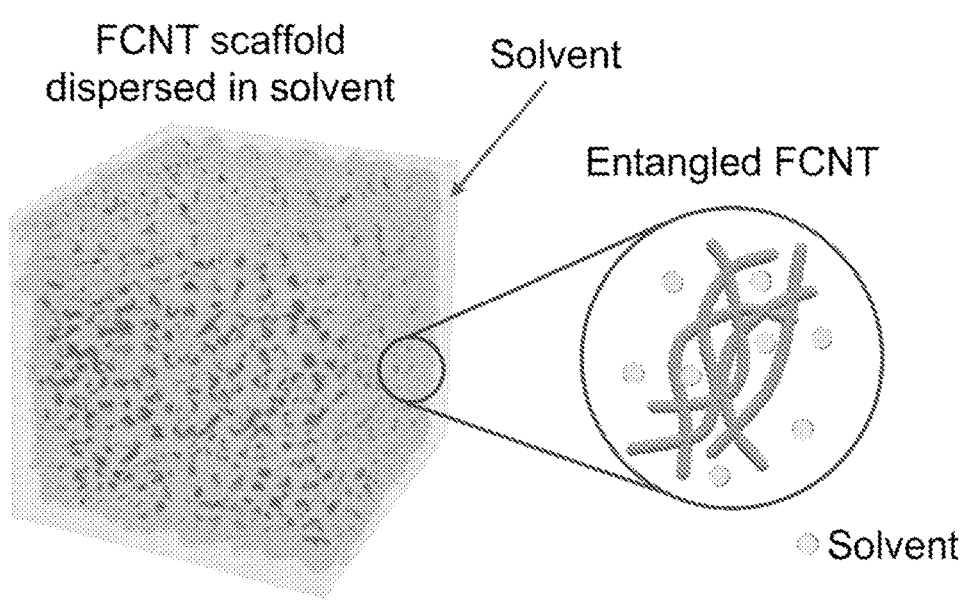
FIG. 9 is a schematic diagram showing a three-dimensional porous scaffold structure of FCNT in a dispersion.

FIGS. 8 and 9 show the schematic diagrams of the self-assembly process of FCNT in the dispersion and FCNT having a three-dimensional porous scaffold structure. When conventional CNT is dispersed in a solvent, it is present in the state of agglomerated CNT bundles, but FCNT of the present invention was confirmed to have a three-dimensional porous scaffold structure when dispersed in a solvent at a high concentration. That is, it was confirmed that solvents were present between entangled FCNT and on the outside of the three-dimensional porous scaffold, and thus, FCNT had dispersion stability even at a high concentration.

Next, in order to evaluate the dispersion degree of the prepared FCNT dispersion, the prepared CNT was dissolved in various solvents and observed.

Figure 10:
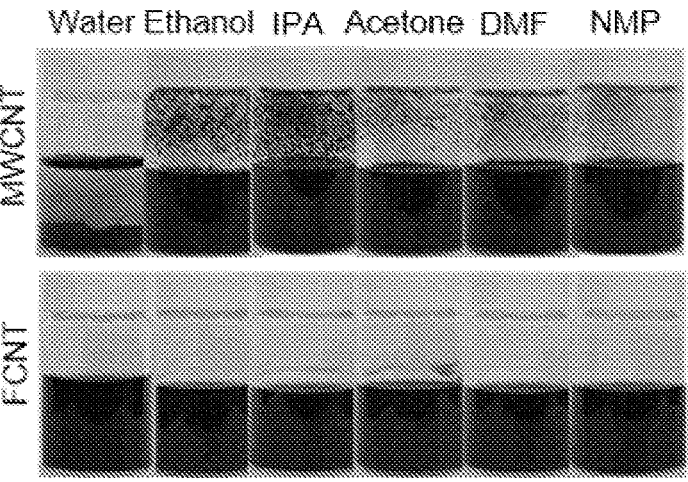
FIG. 10 is a drawing showing a dispersion degree when MWCNT and FCNT were dissolved in various solvents.

Referring to FIG. 10, when conventional MWCNT and FCNT obtained by partial oxidation of MWCNT were mechanically mixed by ball milling and sonication and were dispersed in various solvents at a concentration of 1 mg/mL, MWCNT was not dispersed to show agglomeration of particles at the same concentration, while the phenomenon was not observed in FCNT. A dispersion which was dispersed in water at a high concentration of 40 mg/mL or more may be prepared based on the dispersion stability, and the dispersion had viscoelasticity. That is, it was confirmed that agglomeration was suppressed regardless of the kind of solvents, by FCNT having a three-dimensional scaffold structure produced by partial oxidation of MWCNT, and thus, the dispersion degree was greatly improved.

Figures 11A, 11B, 11C:
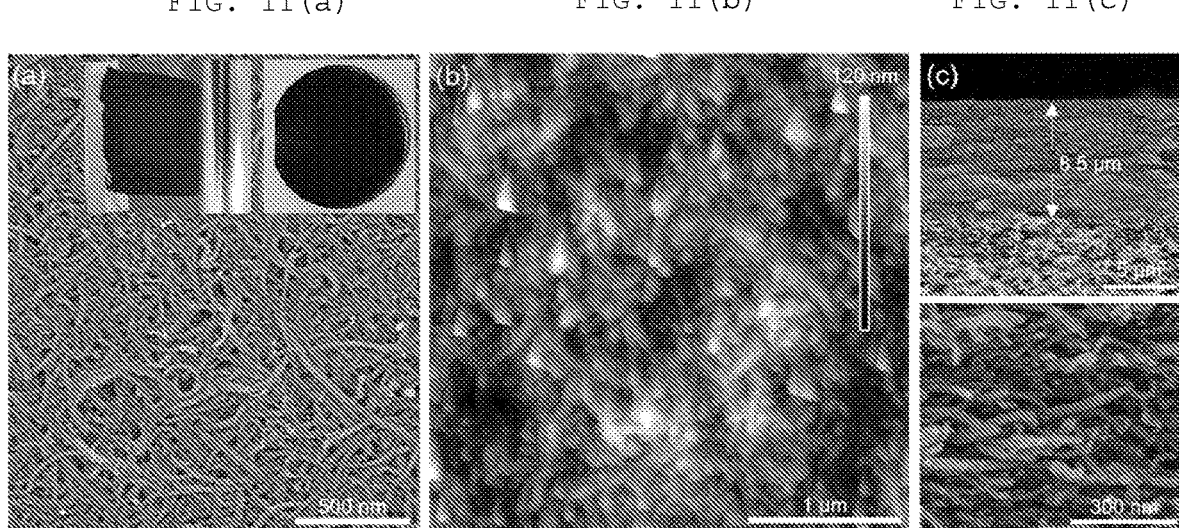
FIGS. 11(a)-(c) are drawings of (a) an upper surface of a FCNT film observed by SEM, (b) the FCNT film observed by AFM, and (c) a cross section of the FCNT film observed by SEM.

Next, it was confirmed that a very uniform FCNT film was manufactured by bar coating which is a kind of manufacturing process of a film having a large area using a high-concentration FCNT dispersion having viscoelasticity. Referring to FIGS. 11(a) and (b), no agglomeration was observed in the manufactured FCNT film, and it is recognized that the films had very low $R_q$ of 15.6 nm and a very uniform structure. In addition, referring to FIG. 11(c), it was confirmed that the manufactured film had a thickness of about 8.5 μm and had a porous structure of CNT by the side structure of the film. It was confirmed that as a force was applied to the FCNT scaffold, the scaffold was broken and the nanoplates of the scaffold were arranged and coated, thereby manufacturing the uniform film.

<Experimental Example 3> Filtration Test Using GONR/FCNT/PES Separator

In order to evaluate the filtration performance of the GONR/FCNT/PES separator according to the example, a salt and a dye solution were measured using dead-end filtration at 10 bar. A filtration test was performed using 0.1 M $Na_2SO_4$, NaCl, $MgSO_4$, and $MgCl_2$ salts and 10 mg/L of methyl red (MR, 269 Da), methylene blue (MnB, 320 Da), brilliant blue G (BBG, 854 Da), and rose bengal (RB, 1018 Da) organic dyes as a probe molecule. An effective area of the membrane was 4.52 $cm^2$, and pressurization by $N_2$ was performed and filtration was performed 10 bar. For high-pressure performance evaluation, a gas pressure was increased from 10 bar to 30 bar using a regulator. The concentration of the salt was measured using an ion probe conductor (Hi 9033, Hanna Instruments, USA), and the concentration of the organic dye was measured by UV-vis spectrometry.

Here, permeability (J) was calculated by the following Equation 1:

$$J = \frac{V_p}{t \times A \times \Delta p} \qquad \text{[Equation 1]}$$

wherein $V_p$ is a volume (L) of a permeated liquid, A is an effective area (m$^2$) of a membrane, t is a permeation time (h), and $\Delta p$ is an intermembrane differential pressure (bar).

In addition, a rejection rate (R) was calculated by the following Equation 2:

$$R = \frac{(C_f - C_p)}{C_f} \times 100 \qquad \text{[Equation 2]}$$

wherein $C_f$ is a concentration of a supply solution, and $C_p$ is a concentration of a permeated solution.

Next, membrane performance under real conditions was measured using a cross flow filtration system. 10 mg/L BBG was used as a probe molecule, and an intermembrane pressure was 8 bar. Equations 1 and 2 were used to calculate the permeability and the rejection rate, and the effective area of the membrane was 7.07 cm$^2$.

First, the permeability and the rejection rate of Na$_2$SO$_4$ (Z$^+$/Z$^-$: ½), NaCl (Z$^+$/Z$^-$: 1), MgSO$_4$ (Z$^+$/Z$^-$: 1), and MgCl$_2$ (Z$^+$/Z$^-$: 2) having a concentration of 0.1 M were measured. Referring to FIG. 12(a), permeability in the range of 7 to 11 LMH/bar was shown in all salt solutions. However, since the d-spacing (7.5 Å) of the GONR layer was larger than the radius of hydrated ions (Na$^+$: 3.79 Å, Mg$^{2+}$: 4.28 Å, Cl$^-$: 3.32 Å, SO$_4$$^{2-}$: 3.79 Å), the rejection rate was confirmed to be less than 20%.

In addition, the permeability and the rejection rate were measured using methyl red (MR, 269 Da, electrically neutral), methylene blue (MnB, 320 Da, positive charge), brilliant blue G (BBG, 854 Da, negative charge), and rose bengal (RB, 1018 Da, negative charge) as a probe molecule. Referring to FIG. 12(b), high rejection rates (~100%) were shown in all dyes, and since rich nanopores were present in the GONR layer, a pure permeability (22 LMH/bar) of 86% was maintained in the presence of a dye molecule (19 LMH/bar). That is, it was confirmed that due to the presence of the GONR layer, an organic dye having a large particle size showed a high rejection rate by the double membrane.

Figure 13:
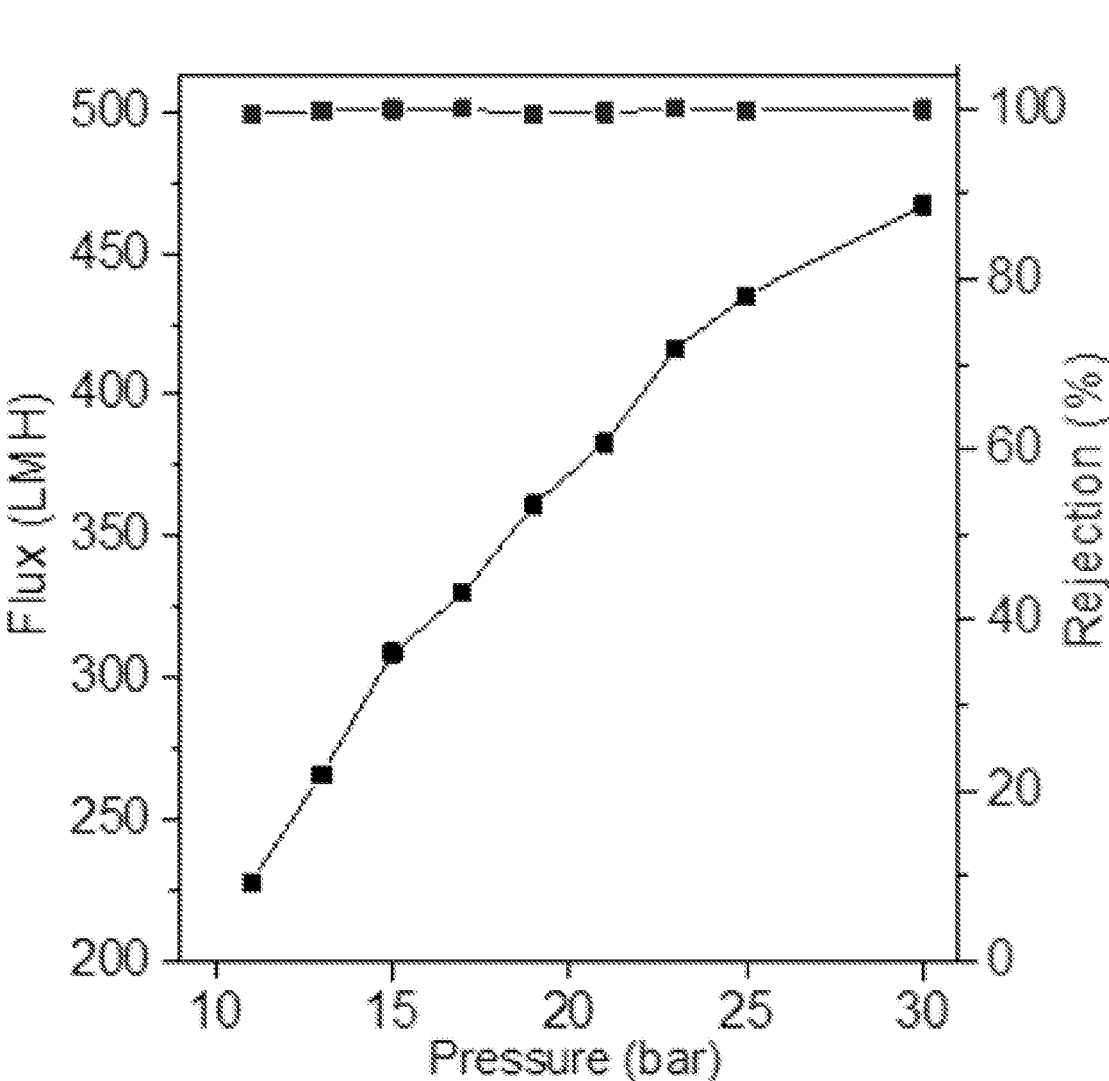
FIG. 13 is a graph showing permeability and rejection rates when pressure was applied to the separator according to an exemplary embodiment of the present invention.

Next, in order to measure mechanical stability at high pressure, 10 mg/L of a BBG solution was used to increase the pressure up to 30 bar, thereby performing a filtration test. Referring to FIG. 13, as an operation pressure was increased from 11 bar to 30 bar, a flow rate was increased from 228 LMH to 467 LMH, and stable mechanical properties provided by the FCNT layer were confirmed while maintaining a rejection rate of 100%. That is, it was confirmed that mechanical stability was maintained by the entangled structure of the FCNT layer and the stable bond between the FCNT layer and the GONR layer even at increased pressure.

<Experimental Example 4> Diafiltration Test Using GONR/FCNT/PES Separator

The GONR/FCNT/PES separator according to the example was used to measure the separation ability of a salt/dye mixture. The mixture was prepared by dispersing a dye (MR, MnB, BBG) having a concentration of 10 mg/L in a 6 g/L NaCl solution. The moisture permeability and the rejection rate were determined by Equations 1 and 2, and the separation factor of the diafiltration was calculated using the following Equation 3:

$$\text{Separation Factor} = \frac{1 - R_{NaCl}}{1 - R_{dye}} \qquad \text{[Equation 3]}$$

Figure 14:
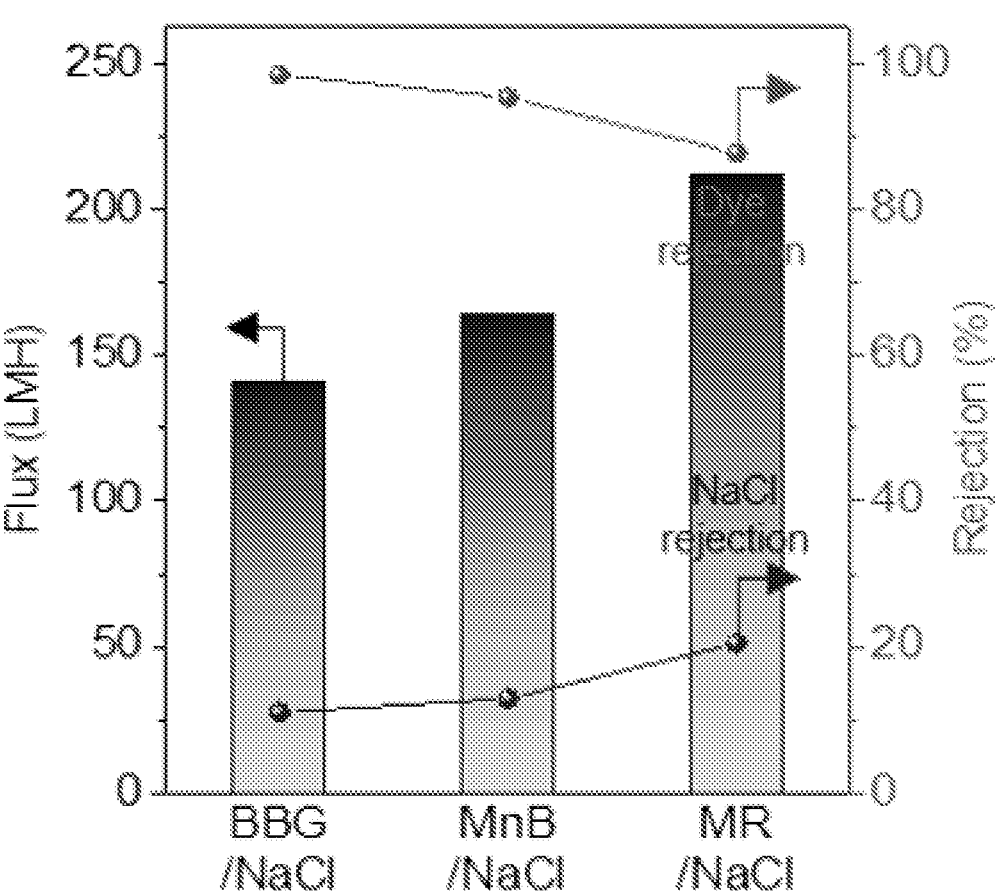
FIG. 14 is a graph showing permeability and rejection rates when a mixture of a salt and an organic dye was permeated through the separator according to an exemplary embodiment of the present invention.

First, diafiltration performance was measured using BBG/NaCl, MnB/NaCl, and MR/NaCl in a dead-end system at a pressure of 10 bar. The mixtures were prepared at a concentration of 10 mg/L and 6 g/L, respectively for the dye and the salt. Referring to FIG. 14, the rejection rates of 98.4%, 95.3%, and 87.7% were shown, respectively, for BBG, MnB, and MR, in each dye/salt mixture. That is, the rejection rate in the presence of a salt ion was a little decreased as compared with the case without a salt ion, and this is confirmed to be because the hydrated radius of the dye was decreased by a salting out effect by the presence of the salt, and the interlayer spacing of GONR by the inserted ion was increased. However, it was confirmed that due to the presence of the GONR layer, an organic dye having a large particle size showed a high rejection rate by the double membrane, in both cases of using the dead-end system and using a real double membrane.

Figure 15:
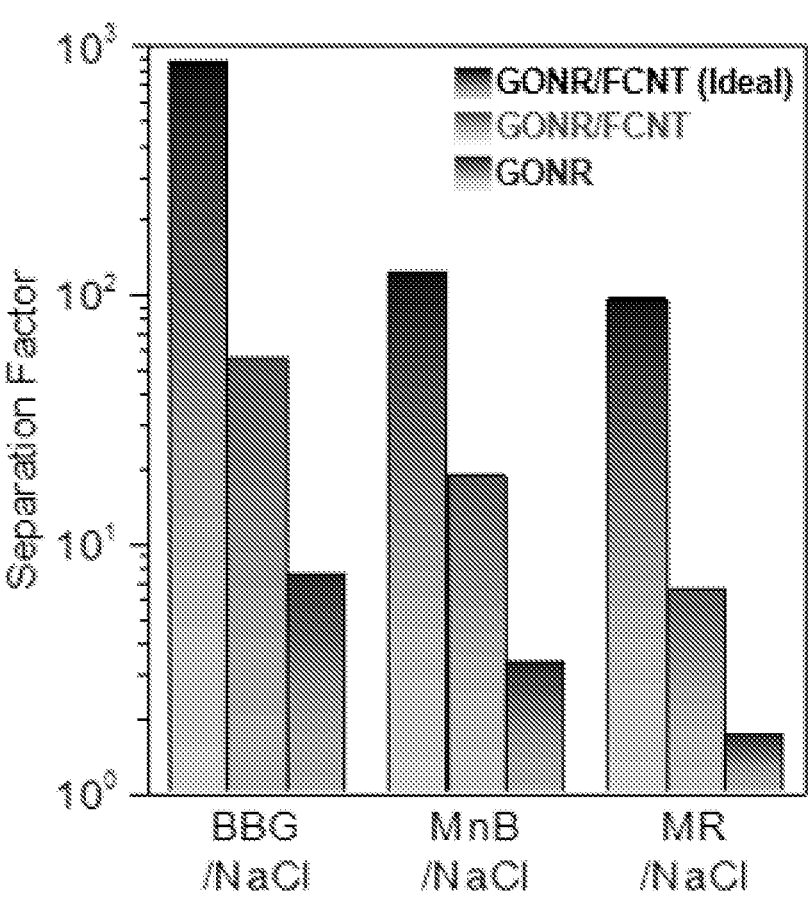
FIG. 15 is a graph showing separation factors when a mixture of a salt and an organic dye was permeated through the separator according to an exemplary embodiment of the present invention.

Next, in order to evaluate the separation ability of the salt/dye mixture in the dead-end system, a diafiltration separation factor was measured. Referring to FIG. 15, an ideal separation factors of the GONR/FCNT/PES separator were 853, 122, and 95, respectively, for BBG/NaCl, MnB/NaCl, and MR/NaCl mixtures, but the real separation factors of the GONR/FCNT/PES separator was 55.6, 18.5, and 6.5, which showed lower diafiltration performance than expected. However, the diafiltration performance of the separator was higher than the GONR membrane of which the separation factors were 7.5, 3.3, and 1.7. It was confirmed that this is due to the presence of the FCNT layer which suppresses the change of the GONR layer structure under high pressure and an ion solution.

In summary, according to the separator and the method for manufacturing the same of the present invention, a separator having excellent mechanical stability is manufactured without an additional chemical treatment and chemical cross-linking, and thus, a separator having excellent separation ability even at high pressure may be manufactured.

According to the polar carbon nanotube dispersion, the separator manufactured therefrom, and the method for manufacturing the same of the present invention, a polar carbon nanotube dispersion, which may be dispersed in a solvent at a high concentration even without use of a surfactant or a stabilizer, may be prepared, and a separator, which is not easily exfoliated and may be stably used even under a high pressure, may be manufactured, based on a polar carbon nanotube prepared from the polar carbon nanotube dispersion and a polar one-dimensional carbon body.

What is claimed is:
1. A separator comprising:
a porous support;
a porous first coating layer including a polar carbon nanotube, placed on the porous support; and a second coating layer including a polar one-dimensional carbon body, placed on the porous first coating layer, and wherein the porous first coating layer does not comprise a surfactant.

2. The separator of claim 1, wherein the polar carbon nanotube has an oxygen/carbon atomic ratio of 0.1 or more and a full width at half maximum of 2.0 or more at a position of $2\theta=25.6°$ of XRD.

3. The separator of claim 1, wherein the porous first coating layer is prepared by applying a viscoelastic polar carbon nanotube dispersion.

4. The separator of claim 1, wherein a polar group of the polar carbon nanotube is positioned on a surface of the carbon nanotube.

5. The separator of claim 1, wherein a polar group of the polar one- dimensional carbon body includes any one or more selected from the group consisting of a hydroxyl group, an epoxy group, and a carboxyl group.

6. The separator of claim 5, wherein the polar group is unevenly distributed at an edge of the polar one-dimensional carbon body.

7. The separator of claim 1, wherein the polar one-dimensional carbon body is a graphene nanoribbon.

8. The separator of claim 1, wherein an interlayer spacing of the second coating layer is 5 to 20 Å.

9. The separator of claim 1, wherein a thickness ratio between the porous first coating layer and the second coating layer is 5:1 to 20:1.

10. The separator of claim 1, wherein the polar carbon nanotube has a lower oxygen/carbon atomic ratio than the polar one-dimensional carbon body.

11. The separator of claim 1, wherein an organic dye rejection rate is 80% or more and a sodium chloride rejection rate is 20% or less, with respect to a mixture including sodium chloride and an organic dye, under a condition of 10 bar.

* * * * *